United States Patent [19]

Hodson et al.

[11] Patent Number: 5,710,604
[45] Date of Patent: Jan. 20, 1998

[54] VIDEO MEMORY DEVICE FOR COLOR-SEQUENTIAL-TYPE DISPLAYS

[75] Inventors: Lester L. Hodson, McKinney, Tex.; Ulrich Skowronek, Munich, Germany; Charles E. Primm, Plano, Tex.

[73] Assignee: Texas Instruments Incorporated, Dallas, Tex.

[21] Appl. No.: 599,568

[22] Filed: Feb. 9, 1996

[51] Int. Cl.⁶ .................................................. H04N 5/907
[52] U.S. Cl. .......................... 348/717; 348/503; 348/715; 345/153; 345/187; 345/203
[58] Field of Search .................................... 345/186, 187, 345/188, 201, 203, 88, 150, 153, 154, 115; 348/503, 504, 514, 715, 717, 719, 742, 743, 390, 391, 393, 392, 718; H04N 5/907

[56] References Cited

U.S. PATENT DOCUMENTS

| | | | |
|---|---|---|---|
| 4,497,005 | 1/1985 | Baleshita et al. | 348/391 |
| 4,845,553 | 7/1989 | Konomura et al. | 348/71 |
| 5,181,014 | 1/1993 | Dalrymple et al. | 345/186 |
| 5,280,578 | 1/1994 | Kamiyama et al. | 345/187 |
| 5,523,786 | 6/1996 | Parulski | 348/269 |

*Primary Examiner*—John K. Peng
*Assistant Examiner*—Jeffery S. Murrell
*Attorney, Agent, or Firm*—Christopher L. Maginniss; W. James Brady, III; Richard L. Donaldson

[57] ABSTRACT

A field emission device (10) includes a video memory device (12) that receives video data in parallel for each of three colors red, green, and blue. The video memory device (12) provides the video data in color sequential manner to a controller (14). The controller (14) provides appropriate control and data signals in response to the video data to drive a field emission device display (22). The video memory device has a first storage area (30) for a first color (red), a second storage area (32) for a second color (green), and a third storage area for a third color (blue). The second storage area (32) has capacity to store all of the second color of a frame, the first storage area (30) is two-thirds the size of the second storage area (32), and the third storage area (34) is one-third larger than the second storage area (32). The different sizes of the respective storage areas allows for 100% use of memory space without waste. Simultaneous writing into and reading from each storage area is performed in such a manner as to not lose any of the video data.

20 Claims, 3 Drawing Sheets

VIDEO MEMORY DEVICE FOR COLOR-SEQUENTIAL-TYPE DISPLAYS

TECHNICAL FIELD OF THE INVENTION

The present invention relates in general to memory devices and more particularly to a video memory device for color sequential type displays.

BACKGROUND OF THE INVENTION

Display technology continues to progress with real-world applications demanding thinner, lighter, and less expensive displays that consume minimal amounts of power. One display category, flat panel display, is especially useful for portable electronic devices, such as laptop and notebook computers, because of its small thickness and size. In addition to small size, such displays must be of light weight and consume minimal amounts of power as these displays typically use batteries for a power supply. Lighter-weight batteries are more desirable than heavier ones, but usually (for the same battery technology) provide less power.

Flat panel displays, such as field emission device (FED) displays and liquid crystal displays (LCD's) require video memory to store individual video images or frames before displaying them. Video memory is expensive and contributes to overall power consumption. But such memory is essential, especially if the display is of the so-called color sequential type, because this memory must rearrange the video data from the format supplied by the video source to the format required by the FED display.

A pixel is the smallest image-forming unit of a video display. A common display resolution is VGA, which consists of 480 lines of 640 pixels each. Higher resolutions in use are S-VGA: 600 lines with 800 pixels each, and XGA with 756 lines of 1024 pixels each. For black and white displays, the brightness data for each pixel must be stored in the video memory. To achieve highest brightness resolution perceivable by the human visual system (eye and brain) requires 8 bits of brightness data per pixel.

In color displays each pixel has the capability to emit or transmit each of the three primary colors. If all colors of the visible spectrum must be reproduced, 8 bits of brightness data must be stored in the video memory for each of the three colors, or 24 bits total per pixel. Because video memory is expensive and consumes power, many color displays do not generate all colors of the visible spectrum and store less than 8 bits of brightness data per color. This results in a color reproduction that appears less than natural.

It follows from the above that the amount of video memory required for a display is proportional to the spatial resolution and to the color resolution it offers. Any techniques which serve to reduce the video memory capacity, or the power consumption per capacity increment, are very beneficial for portable display applications. In addition, any techniques which reduce the cost of such video memory bring additional benefits both to portable and stationary applications.

In addition to power consumption and cost, another memory parameter which must be optimized for displays is the speed at which such memory operates. To display flicker-free video images, a display must generate each frame within a given time, usually one-sixtieth to one-eightieth of a second. If during this given frame time more pixels must be addressed, as is necessary for higher resolution displays, then the video memory must operate faster. The speed requirements which displays with high spatial and color resolution place on video memories are higher than what memories made with today's manufacturing technologies can provide.

A display implementation which is particularly advantageous for portable applications that require high resolution and high display speeds is the FED display. Such FED displays are color sequential type displays. This means they emit one of the three primary colors for one-third of a frame period, then switch over to emission of the second primary color, which takes another third of the frame time, and finally switch to emission of the third color, for the last third of the frame period. The reason for this type of operation lies in the relatively long time required to switch such a display over from emitting one primary color to emitting another one, so that such switch-over cannot be accomplished on a pixel-by-pixel basis.

Color sequential type displays thus require the video memory to provide data, pixel by pixel, for the first color, within about one-third of the frame period, then to provide data for the second color, again within about one-third of the frame period, and finally to provide data for the third color. At the same time, data arrives from the data source (for example from a computer or from a video recorder or another TV-like source) in a pixel-sequential format, i.e. all three colors of a pixel together, one pixel at a time. The video memory must therefore transform video data from the incoming format to the format required by the FED display, or in other words, act as a reformatting memory.

This reformatting must be done in such a way that no motion-related artifacts are generated. The conventional solution for such artifact-free reformatting is to employ so-called double buffering in the video memory. Here incoming data is written into one section of the memory, during one frame period, in the format supplied by the video source. This memory section must be large enough to store one full video frame.

When the next video frame comes in, it is written into a second section of the memory, which is just as large as the first section, while the first section is read out, in the format required by the FED display. By means of such double buffering, motion artifacts are avoided, but at the expense of twice as much memory capacity as is needed with correspondingly high cost and high power requirements. For 8-bit color width and VGA resolution, memory capacity for double buffering is 14,745,600 bits. Therefore, it is desirable to increase the efficiency and speed of a video memory for an FED display.

SUMMARY OF THE INVENTION

From the foregoing, it may be appreciated that a need has arisen for a video memory with increased speed while still implementing conventional memory technology. A need has also arisen for a video memory that effectively and efficiently uses its memory space and requires only enough memory space to perform the memory operation without having wasted excess memory space. In accordance with the present invention, a video memory for color sequential type displays is provided that substantially reduces or eliminates the disadvantages and problems associated with conventional video memory techniques.

According to an embodiment of the present invention, a video memory device for a color sequential type display includes a first storage area that stores video data corresponding to a first color of the frame. The first storage area can simultaneously receive and provide the first color while having a capacity of storing less than the first color of the frame. The video memory device also includes a second storage area that stores video data corresponding to a second color of the frame. The second storage area can simultaneously receive and provide the second color and has a capacity of storing the second color of the frame. The video memory device further includes a third storage area that stores video data corresponding to a third color of the frame. The third storage area can simultaneously receive and provide the third color and has a capacity of storing more than the third color of the frame.

The present invention provides various technical advantages over conventional video memory techniques. For example, one technical advantage is to reformat video data without creating motion artifacts. Another technical advantage is to handle data traffic at higher speeds with a decrease in power consumption. Yet another technical advantage is to reduce the size of memory for each color to a minimum through simultaneous read and write operations. Still another technical advantage is to achieve full color resolution and high spatial resolution through low cost and low speed memories. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
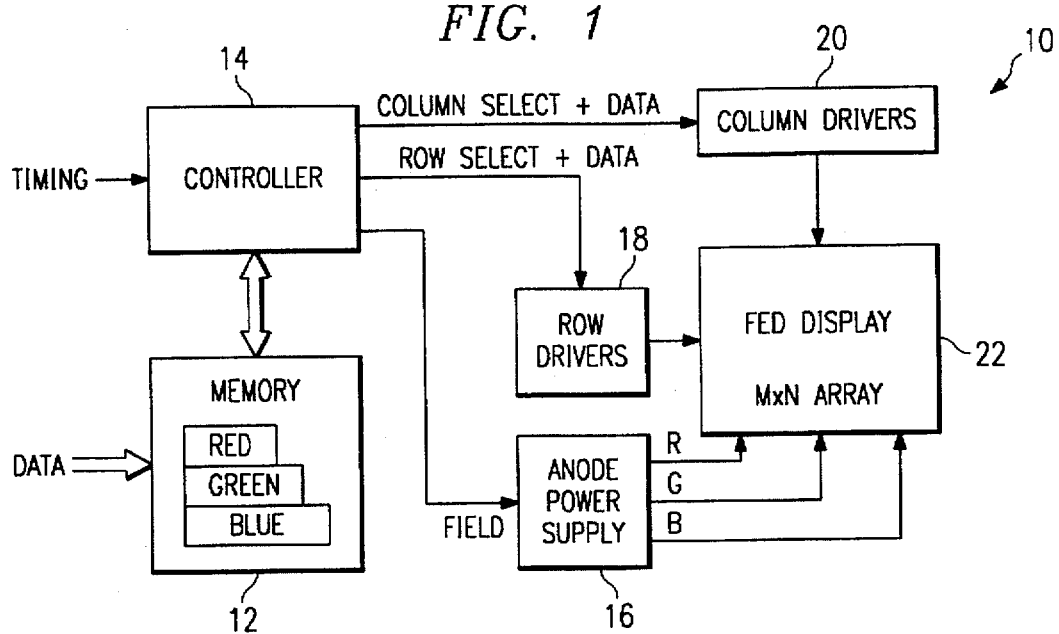
FIG. 1 illustrates a block diagram of a field emission display device.

FIG. 1 is a functional block diagram illustrating a field emission device 10. Field emission device 10 includes a video memory device 12 that receives and stores video data and provides video data to field emission device display 22 in a color sequential video data format through a controller circuit 14. Controller circuit 14 controls the operation of video memory device 12 and produces control signals for operating field emission device display 22 in response to receiving video data from video memory device 12. An anode power supply 16 provides power to the anode electrode of field emission device display 22 for each color in a sequential fashion as determined by controller circuit 14 in response to the video data within video memory device 12. Row drivers 18 and column drivers 20 address individual pixels of field emission device display 22 as determined by controller circuit 14.

Video memory device 12 can receive, store, and provide at least one frame of video data. Video memory device 12 receives and stores each frame of video data according to red, green, and blue video data fields. Red, green, and blue light are the three primary colors that may be combined to produce any color of light in the visible spectrum. Hence, each frame of video data sent to field emission device display 22 contains a red video data field, a green video data field, and a blue video data field. Each field of video data is sent sequentially to field emission device display 22 which has been described as the color sequential video data format. Anode power supply 16 supplies power to the anode of field emission device display 22 corresponding to the emission of either red, green, or blue light and also corresponding to whether a red, green, or blue video data field is being sent to field emission device display 22.

In operation, controller circuit 14 provides timing signals and control signals so that video memory device 12 may receive, store, and supply color video data. Controller circuit 14 could be a microprocessor. Controller circuit 14 enables video memory device 12 to receive and store red video frame data field, green video frame data, and a blue video frame data at the same time or in parallel format. All three of these video data fields correspond to one video frame. Controller circuit 14 then provides a read enable control signal to video memory device 12 instructing video memory device 12 to supply first the red video data field, then the green video data field, and finally the blue video data field. The three video data fields are supplied one at a time or serially to controller circuit 14.

Controller circuit 14 first read enables video memory 12 to provide the red video data field of a video frame. Controller circuit 14 provides control signals in response to the red video data field to row drivers 18 and column drivers 20 in order to address individual pixels of field emission device display 22 that are determined to display red light according to the red video data field. Anode power supply 16 supplies power to the anode of field emission device display 22 causing the emission of red light from each pixel so addressed by row drivers 18 and column drivers 20.

After video memory device 12 supplies all of the video data corresponding to the red video data field, controller circuit 14 read enables video memory device 12 to provide the green video data field. Controller circuit 14 provides control signals in response to the green video data field to row drivers 18 and column drivers 20 in order to address individual pixels of field emission device display 22 that are determined to display green light according to the green video data field. Anode power supply 16 provides power to the anode of field emission device display 22 so that green light will be emitted from each pixel addressed by column drivers 20 and row drivers 18.

Once the green video data field has been supplied and displayed by field emission device display 22, controller circuit 14 read enables video memory device 12 to provide the blue video data field. Controller circuit 14 provides control signals in response to the blue video data field to row drivers 18 and column drivers 20 in order to address individual pixels of field emission device display 22 that are determined to display blue light according to the blue video data field. Anode power supply 16 supplies power to the anode of field emission device display 22 causing the emission of blue light from each pixel so addressed by row drivers 18 and column drivers 20. All of the above events occur at a very fast rate to supply a "flicker-free" or stable video output.

Once all three video data fields have been supplied and displayed by field emission device display 22, the same events occur for the red, green, and blue video data fields of the next video frame. Video memory device 12 actually begins to receive the next video frame before the prior video frame has been completely displayed. Video memory device 12 simultaneously reads and writes video data. This produces a read/write overlap conflict. To overcome this conflict, read and write operations may be performed simultaneously within video memory device 12. To allow for simultaneous read and write, the amount of video memory is greater than one video frame in order to prevent a memory conflict or loss of video data.

Figure 2:
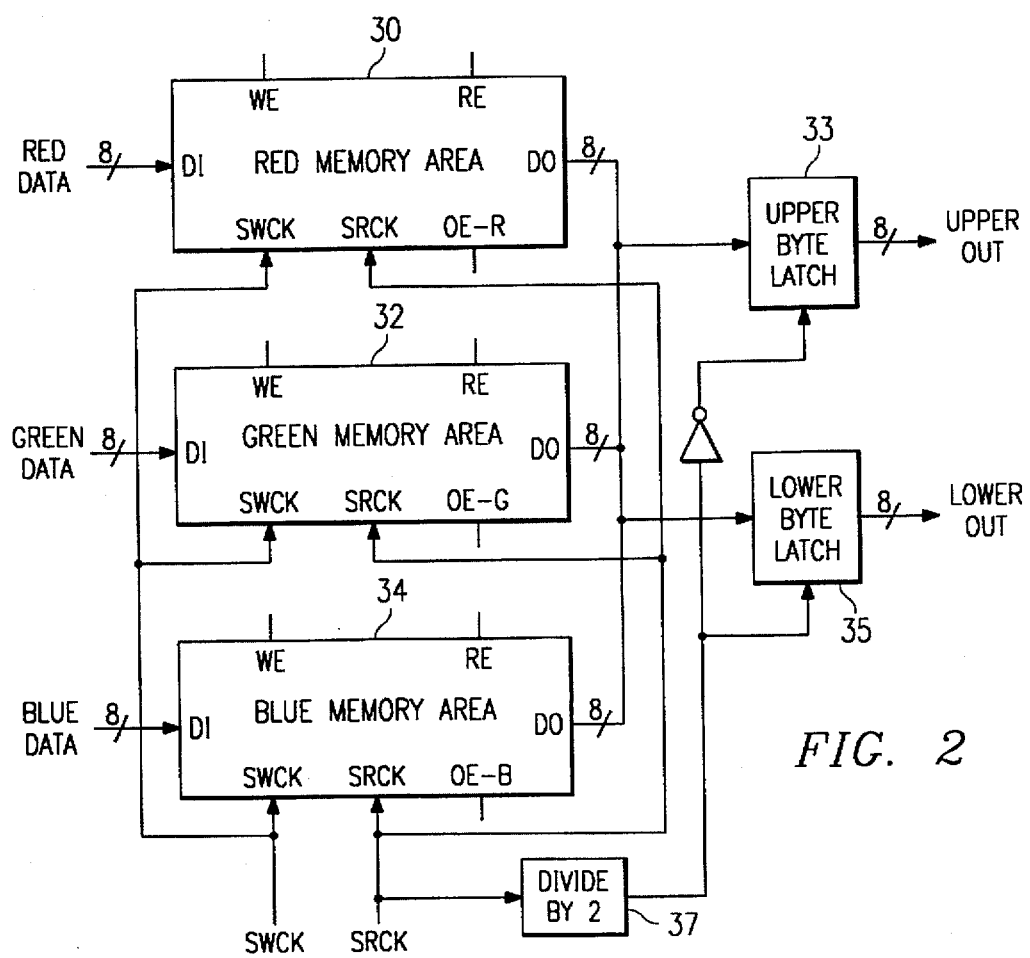
FIG. 2 illustrates a block diagram of a video memory in the field emission display device.

FIG. 2 shows a block diagram of video memory device 10. Video memory device 10 includes three storage areas, a first storage area 30 for the first color to be emitted by field emission device display 22 (shown as RED), a second storage area 32 for the second color (shown as GREEN), and a third storage area 34 for the third color (shown as BLUE). The assignment of RED, GREEN, and BLUE to first, second, and third storage areas is arbitrary as any other assignment can be made with equal effectiveness.

Each of the storage areas for the three colors is implemented by a 2-port memory block. In such a memory, it is possible to write into one address through the write port, while at the same time reading may occur from a different address through the read port. Writing and reading may be carried out at different speeds.

During a time slice lasting approximately one-third of a frame, RED data for all pixels of the display is read out, then GREEN data for all pixels is read out during the second one-third of a frame time slice, and then BLUE data for all pixels is read out, during the last one-third of a frame time slice. Whether the memory supplies RED, GREEN, or BLUE video data to the FED display is controlled by application of corresponding output enable signals, OE-red, OE-green, OE-blue.

First storage area 30, second storage area 32, and third storage area 34 have different memory capacities. The size of first storage area 30 is approximately one-third less than the size of second storage area 32. The size of third storage area 34 is approximately one-third more than the size of second storage area 32. In order to provide this minimized memory capacity for each given display resolution, a certain optimized memory address allocation scheme in conjunction with a certain optimized timing control of the memory is performed.

Figure 3:
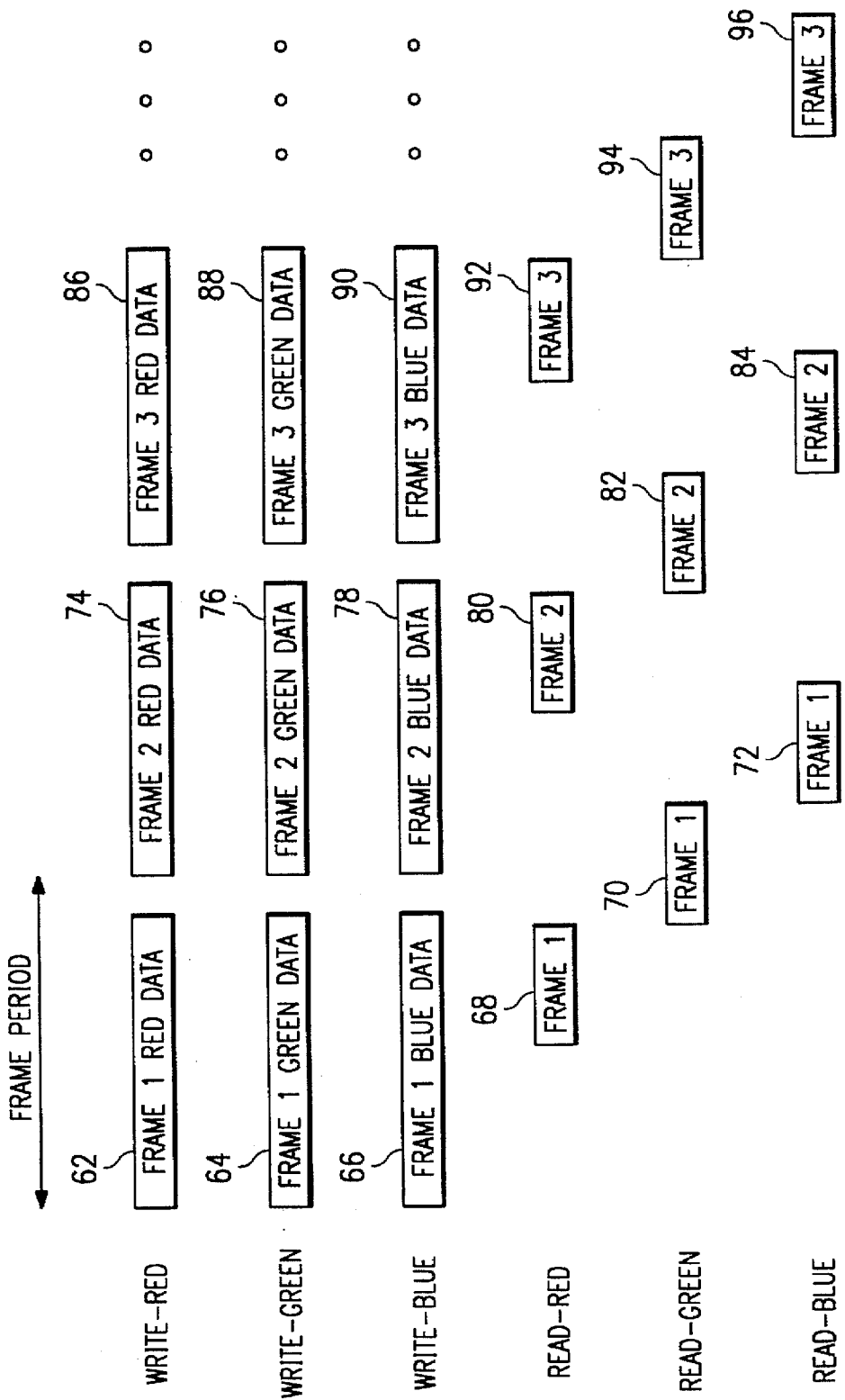
FIG. 3 illustrates a timing diagram of read and write operations of the video memory.

FIG. 3 shows the read and write timing of video memory device 12. Video data is written into the RED, GREEN, and BLUE memory areas in parallel, exactly as the video source supplies this data. As illustrated in the timing diagram of FIG. 3, read-out of the data for each color occurs about three times as fast as writing. Since read-out of the last pixel of RED cannot occur earlier than it has been written in, the end of FRAME 1 writing defines the earliest possible time for reading the last FRAME 1 pixel of RED. In other words, the end of timing block 68 must occur no sooner than the end of timing blocks 62, 64, and 66.

The end of timing block 68 and the reading speed defines the earliest possible beginning of RED color reading. Reading out RED data starts after about ⅔ of FRAME 1 has been written into each storage area. Since reading speed is three times as fast as writing, subsequent RED input data may be directed to write into the beginning of first storage area 30 again and over-write previous FRAME 1 data. Therefore, first storage area 30 for RED input data need not be larger than ⅔ of a frame.

GREEN video data reading may commence after all FRAME 1 RED DATA 68 has been read out and after the display emission has been switched to green color by application of a proper anode bias signal by controller circuit 22. FIG. 2 shows that this may occur slightly before new input data, FRAME 2 GREEN DATA 76, is written into the second storage area 32. Because reading speed is three times faster than writing speed, FRAME GREEN 2 DATA 76 will not overwrite FRAME 1 GREEN DATA 64 before it has been read. Therefore, second storage area 32 for GREEN input data has the capacity to store exactly one full frame of video data.

Reading of FRAME 1 BLUE DATA 66 cannot start before all FRAME 1 GREEN DATA 70 has been displayed and the display has been switched to blue emission. As FIG. 3 shows, this may happen after approximately ⅓ of FRAME 2 data has arrived from the video source. To ensure that new incoming FRAME 2 BLUE DATA 78 does not overwrite FRAME 1 BLUE DATA 66, third storage area 34 for BLUE input data has the capacity to store one and ⅓ of a frame of video data.

The total required memory capacity for all three colors then is ⅔ frame deep times the width of one color to store RED, plus 1 frame deep times the width of one color to store GREEN, plus 1⅓ frame deep times the width of one color to store BLUE. For 8-bit color width and VGA resolution, the required capacity is 7,372,800 bits, or exactly one-half of the capacity needed for double buffering, the conventional video memory solution for color sequential type displays. Cutting memory capacity in half achieves the technical advantage of significant reduction of cost and power consumption.

Figure 4:
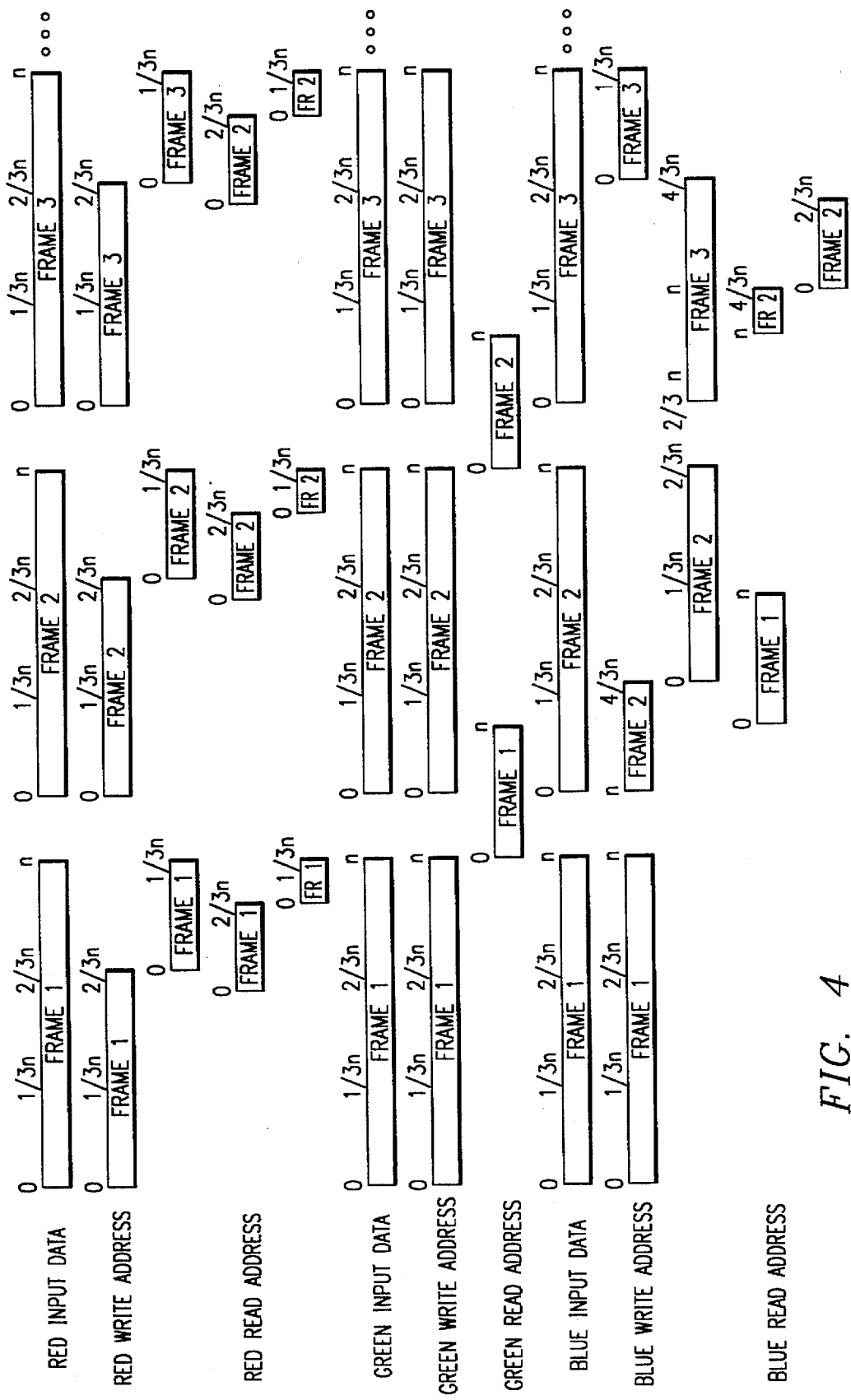
FIG. 4 illustrates a timing diagram of an addressing scheme for the video memory.

Address control of the video memory is implemented to correspond with the storage allocation scheme described above. FIG. 4 shows the addressing scheme for video memory device 10 to allow for 100% memory usage without waste. Second storage area 32 has a capacity from address location 0 to address location n for a frame color length of n. First storage area 30, being one-third smaller, has a capacity from address location 0 to address location 2/3n. Third storage area 34, being one-third larger, has a capacity from address location 0 to address location 4/3n. Color input data for each color is initially received and stored simultaneously and sequentially beginning at location 0 for the respective storage areas. A simple write address counter can be used within each storage area to increment the address locations when storing the respective color input data.

First storage area 30 has a capacity of 2/3n and thus cannot store all of the RED input data of FRAME 1. When the last address location 2/3n is reached, the write address counter resets or rolls over back to address location 0 in order to continue storing the remainder of the RED input data of FRAME 1. To avoid overwriting unread RED input data, first storage area 30 is initiated to begin reading out RED input data through incrementing of a RED address counter prior to the write address counter reaching the last address location 2/3n. In this manner, no RED input data is lost. As the stored RED input data is read out, the remainder of the RED input data is written into first storage area 30 through address location 1/3n. When the last address location 2/3n is reached, the read address counter resets or rolls over to address location 0 in order to read out the remainder of the RED input data. For the next frame of RED input data, the read and write address counters are reset to address location 0 to begin the process for FRAME 2.

Second storage area 32 has a capacity of n and thus can store all of the GREEN input data of FRAME 1. A write address counter in second storage area 32 increments from address location 0 to address location n in order to store the GREEN input data. After the GREEN input data of FRAME 1 is stored, the write address counter resets to address location 0 in preparation for storing the next frame of data.

Reading of the GREEN input data from second storage area 32 begins upon completing the read out of the RED input data for FRAME 1. A read address counter increments from address location 0 to address location n in order to read out the GREEN input data. As shown in the timing diagram, second storage area 30 begins storing GREEN input data of FRAME 2 before completely reading out GREEN input data of FRAME 1. However, the faster rate for reading out data as compared to writing in data ensures that FRAME 2 GREEN input data does not overwrite onto any FRAME 1 GREEN input data. After GREEN input data of FRAME 1 is read out, the read address counter for second storage area 32 resets to address location 0 in preparation for reading out FRAME2 GREEN input data.

Third storage area 34 has a capacity of 4/3n and thus can store all of BLUE input data of FRAME 1 and a portion of FRAME 2 BLUE input data. A write address counter increments from address location 0 to address location 4/3n in order to store BLUE input data of FRAME 1 and one-third of FRAME 2 BLUE input data. The write address counter rolls over to store the remainder of FRAME 2 BLUE input data and eventually continuing to store FRAME 3 BLUE input data. To avoid overwriting of FRAME 1 BLUE input data upon the write address counter rolling over to address location 0, FRAME 1, BLUE input data is read out upon completion of reading out FRAME 1 GREEN input data prior to address roll over. Read out occurs at a faster rate, in this instance three times faster, than the storage rate and thus no data is lost. A read address counter increments from address location 0 to address location n in order to read out FRAME 1 BLUE input data. For reading out FRAME 2 BLUE input data, the read address counter increments from address location n to last address location 4/3n, rolls over, and continues from address location 0 to address location 2/3n. No resetting of the write and read address counters is performed other than a power up reinitialization to allow for continuous address incrementations.

If the data path from the output of the video memory to the FED display can be implemented fast enough, the output latches shown in FIG. 1 are not required, and data can be supplied to the FED display along an 8-bit wide data path. For VGA resolution, the data rate has to be approximately 60 MHz, if the data path is 8 bits wide. If, however, the data path from memory to the FED display cannot be implemented at such high speeds, the addition of the 2 latches, upper byte latch 33 and lower byte latch 35 serves to collect 2 consecutive data bytes from the memory and to transmit these 2 bytes in parallel to the subsequent part of the FED display system. Upper byte latch 33 and lower byte latch 35 collect two consecutive data bytes in conjunction with a divide-by-two frequency divider 37 coupled to the read clock. Thus the data rate can be reduced by a factor of 2. It is possible of course, to collect more than 2 consecutive bytes, by virtue of more latches, and thus reduce data rate even further, at the expense of a wider data path.

If the FED display to be supported by the video memory has a resolution higher than VGA (640×480 pixels), it would be (theoretically) possible to implement the memory larger and faster. SVGA resolution displays require the storage of 800×600 pixels, i.e. a factor of about 1.6 more than VGA resolution. Also the data rates that SVGA video memories must support are 1.6 times higher than for VGA displays. XGA resolution, i.e. 1024×768 pixels, require capacities and data rates about 2.6 times higher.

Such high data rates are not achievable cost-effectively with today's manufacturing technologies. A different alternative to achieve SVGA resolution video memories is to operate 2 VGA memories in parallel and to multiplex input and output data. In a similar manner, 3 VGA video memories can be operated in parallel, to achieve an XGA memory.

This alternative has the additional advantage that it is then necessary to manufacture only one type of memory, for 3 different display resolutions, and thus achieve much higher manufacturing volume for this one device. This will further reduce costs.

In summary, video data is provided to a video memory device on a video frame by video frame basis. Each video frame includes a RED video data field, a GREEN video data field, and a BLUE video data field which may be provided or supplied to the memory device simultaneously in parallel. The video memory device includes a first storage area to hold the RED video data field, a second storage area to hold the GREEN video data field and a third storage area to hold the BLUE video data field. The size of the first storage area is two-thirds of the second storage area. The size of the third storage area is one and one-third larger than the second storage area. A read and write address scheme is employed such that 100% of the memory space of the video memory device is used without loss of video data. Each of the three video data fields is supplied sequentially and serially to a video display. The next video frame is provided to the video memory device before all of the video data from the previous video frame has been provided to the video display. This provides an optimal amount of video memory which provides the technical advantages of reduced power consumption and reduced fabrication costs.

Thus, it is apparent that there has been provided, in accordance with the present invention, a video memory device and method for providing video data to a field emission device display that satisfy the advantages set forth above. Although the preferred embodiment has been described in detail, it should be understood that various changes, substitutions, and alterations can be made herein. For example, the present invention may be provided in one integrated circuit package or in several. The control and timing signals may be implemented and provided in a variety of ways to produce the novel and inventive result. Other examples are readily ascertainable by one skilled in the art and could be made without departing from the spirit and scope of the present invention as defined by the appended claims.

What is claimed is:

1. A video memory device for a color sequential type display, comprising:

a first storage area for receiving, storing, and providing a frame of video data corresponding to a first color of the frame, the first storage area operable to simultaneously receive and provide the first color of the frame of video data, wherein the first storage area has a capacity to store less than the first color of the frame;

a second storage area for receiving, storing, and providing the frame of video data corresponding to a second color of the frame, the second storage area operable to simultaneously receive and provide the second color of the frame of video data, wherein the second storage area has a capacity to store the second color of the frame; and a third storage area for receiving, storing, and providing the frame of video data corresponding to a third color of the frame, the third storage area operable to simultaneously receive and provide the third color of the frame of video data, wherein the third storage area has a capacity to store more than the third color of the frame.

2. The video memory device of claim 1, wherein the first color, the second color, and the third color correspond to red, green, and blue video data such that each storage area corresponds to a different color of video data for the frame.

3. The video memory device of claim 1, wherein the video data corresponding to the first, second, and third colors represent one of a plurality of frames of video data and are received by their respective first, second, and third storage areas in parallel with one another.

4. The video memory device of claim 1, wherein the first storage area, the second storage area, and the third storage area may be individually write enabled and individually read enabled and each storage area may simultaneously receive and sequentially provide video data.

5. The video memory device of claim 4, wherein only one of the first, second, and third storage areas is read enabled at any given time.

6. The video memory device of claim 1, wherein the third storage area is about one and one-third the memory size of the second storage area.

7. The video memory device of claim 6, wherein the first storage area is about two-thirds the memory size of the second storage area.

8. The video memory device of claim 1, wherein the first storage area, the second storage area, and the third storage area begin to receive a next frame of video data before the first, second, and third storage areas have completed providing the frame of video data.

9. A video memory system for a color sequential type display, comprising:

a video memory device operable to receive control signals and to receive and provide a first frame of video data in response to receiving the control signals, the video memory device having a first storage area for storing video data corresponding to a first color of the first frame, a second storage area for storing video data corresponding to a second color of the first frame, and a third storage area for storing video data corresponding to a third color of the first frame, the video memory device further operable to begin receiving a second frame of video data after receiving the first frame of video data but before fully providing the first frame of video data, the first storage area having a memory capacity for storing less than the first color, the second storage area having a memory capacity for storing the second color, the third storage area having a memory capacity for storing more than the third color;

a controller circuit operable to provide the control signals to the video memory device so that the memory device is enabled to receive and provide the video data, the controller circuit further operable to receive the video data from the memory device and operable to provide the video data; and a field emission device display operable to receive the video data provided by the controller circuit, the field emission device display operable to generate a video image in response to the video data.

10. The video memory system of claim 9, wherein the first, second, and third colors correspond to red, green, and blue video data.

11. The video memory system of claim 9, wherein the memory capacity of the third storage area is one-third larger than the memory capacity of the second storage area.

12. The video memory system of claim 11, wherein the memory capacity of the first storage area is one-third smaller than the memory capacity of the second storage area.

13. The video memory system of claim 11, wherein the video memory device receives the video data for the first, second, and third colors in parallel and serially provides video data corresponding to each color in a sequential manner.

14. The video memory system of claim 13, wherein the video memory device serially provides video data for each color at a rate about three times as fast as when receiving video data for each color.

15. The video memory system of claim 9, further comprising an anode power supply operable to receive a field control signal from the controller circuit, the anode power supply operable to provide power to the field emission device display in response to receiving the field control signal.

16. The video memory system of claim 9, wherein the video memory device is a random access memory.

17. The video memory system of claim 9, wherein the video memory device has a read and write enable input for each storage area.

18. A method for providing color video data, comprising the steps of:

storing a first video data field, a second video data field, and a third video data field of a first video frame into a memory device, each video data field corresponding to a particular color of the first video frame;

reading the first video data field of the first video frame and providing the first video data field of the first video frame to the field emission device display while storing the first video frame;

reading the second video data field of the first video frame and providing the second video data field of the first video frame to the field emission device display after completing the storing step of the first video frame;

storing a first video data field, a second video data field, and a third video data field of a second video frame into the memory device, each video data field corresponding to a particular color of the second video frame; and reading the third video data field of the first video frame and providing the third video data field of the first video frame to the field emission device display while storing the second video frame.

19. The method of claim 18, wherein the storing steps include writing the first, second, and third video data fields into the memory device in parallel format.

20. The method of claim 19, wherein a memory capacity of the memory device for storing the third video data field is one-third larger than a memory capacity required to store the second video data field wherein a memory capacity of the memory device for storing the first video data field is one-third smaller than the memory capacity required to store the second video data field.

* * * * *